April 14, 1970   O. HANSEN, JR., ET AL   3,505,780
WRAPPING MACHINE
Original Filed April 30, 1964   10 Sheets-Sheet 1
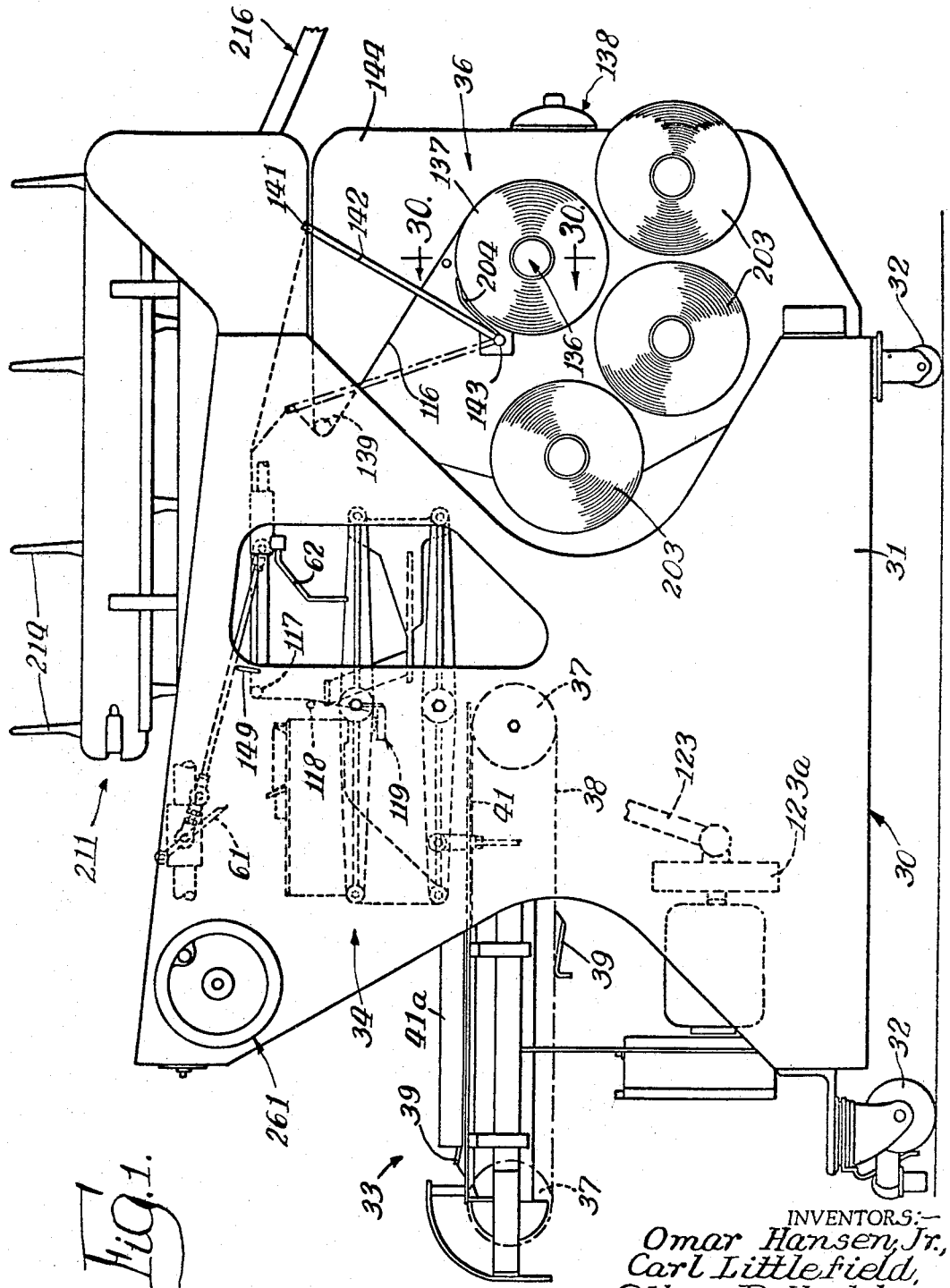
Fig. 1
INVENTORS:—
Omar Hansen, Jr.,
Carl Littlefield,
Allen R. Haddix,
By Hibben, Noyes & Bicknell
Attys.

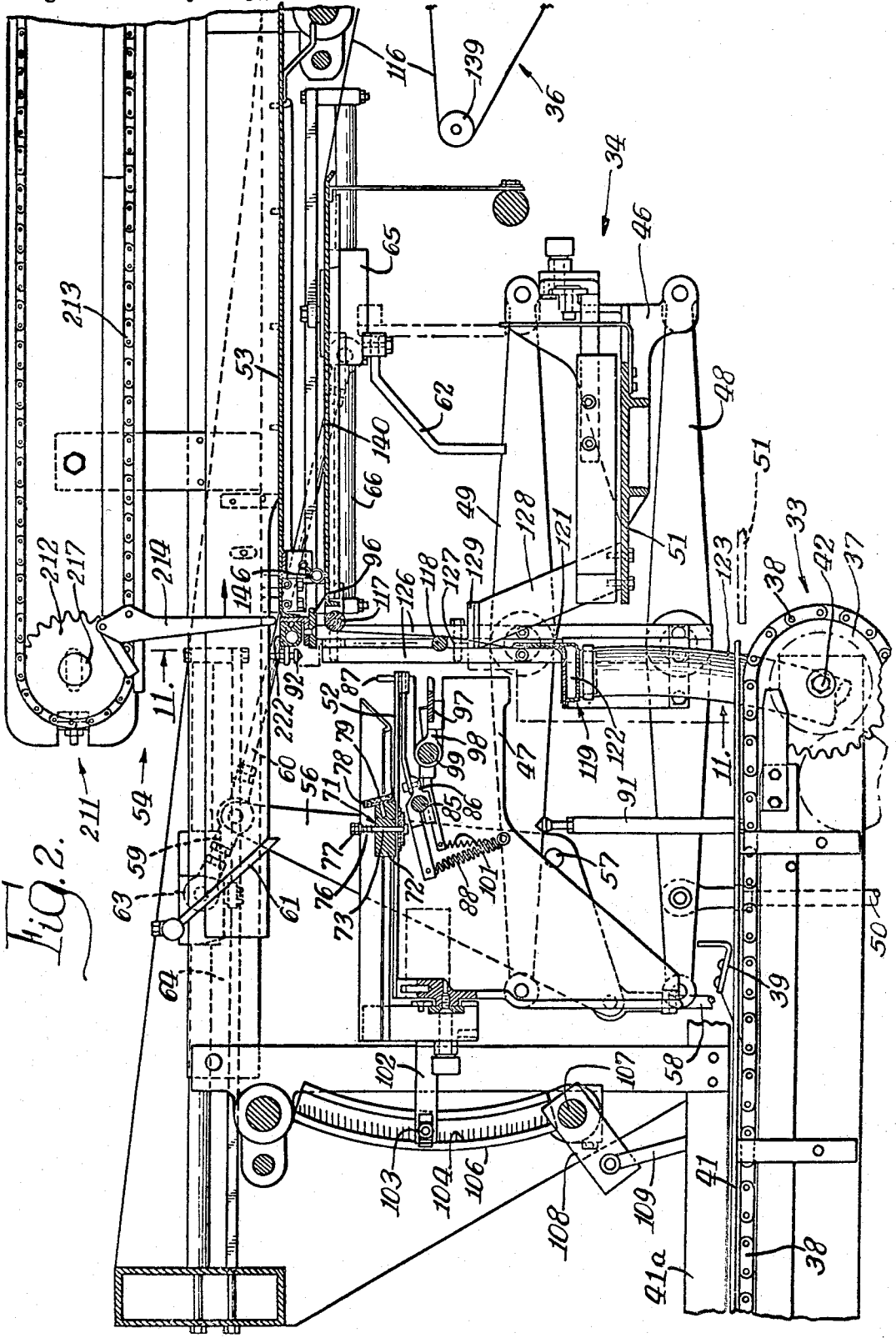

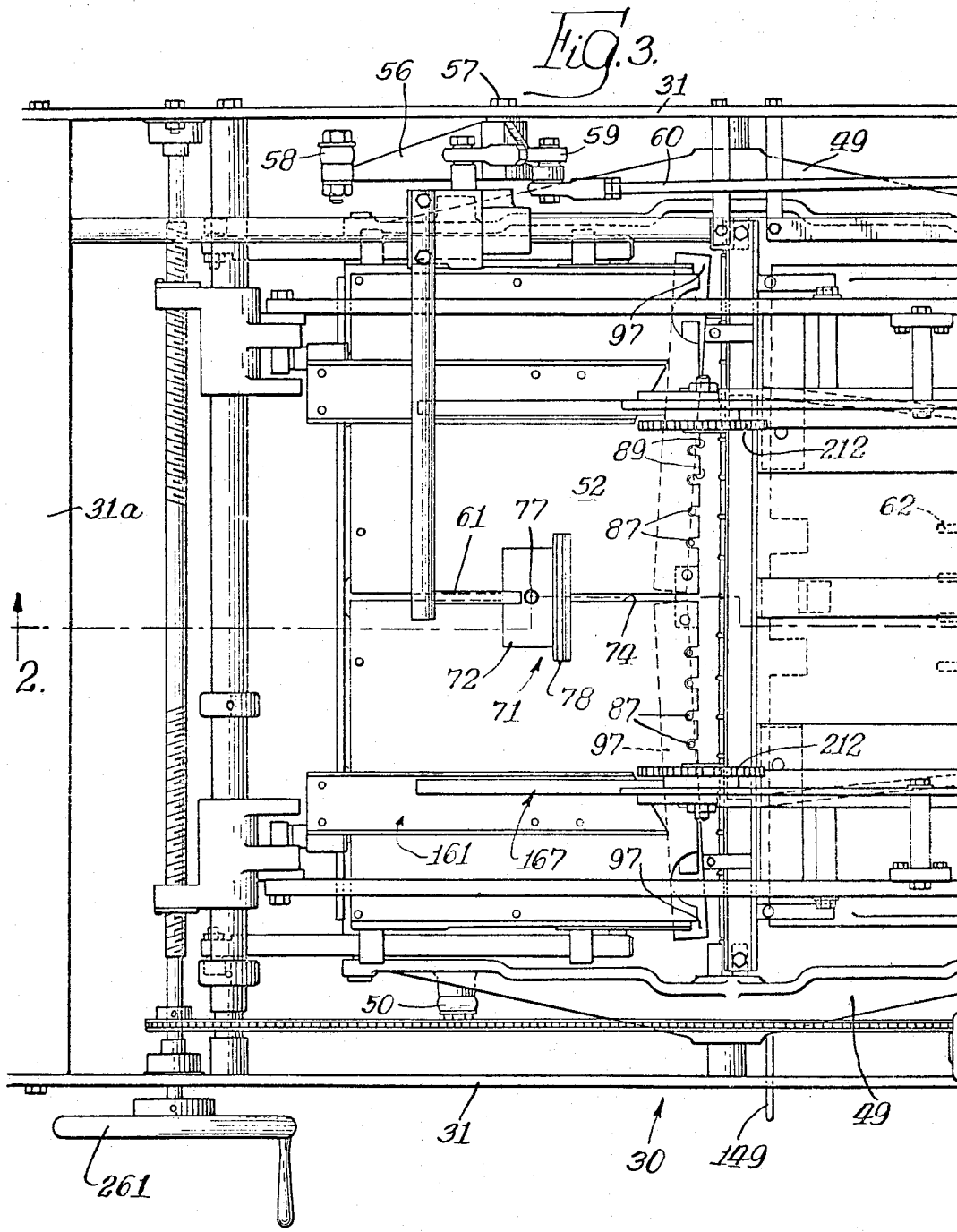

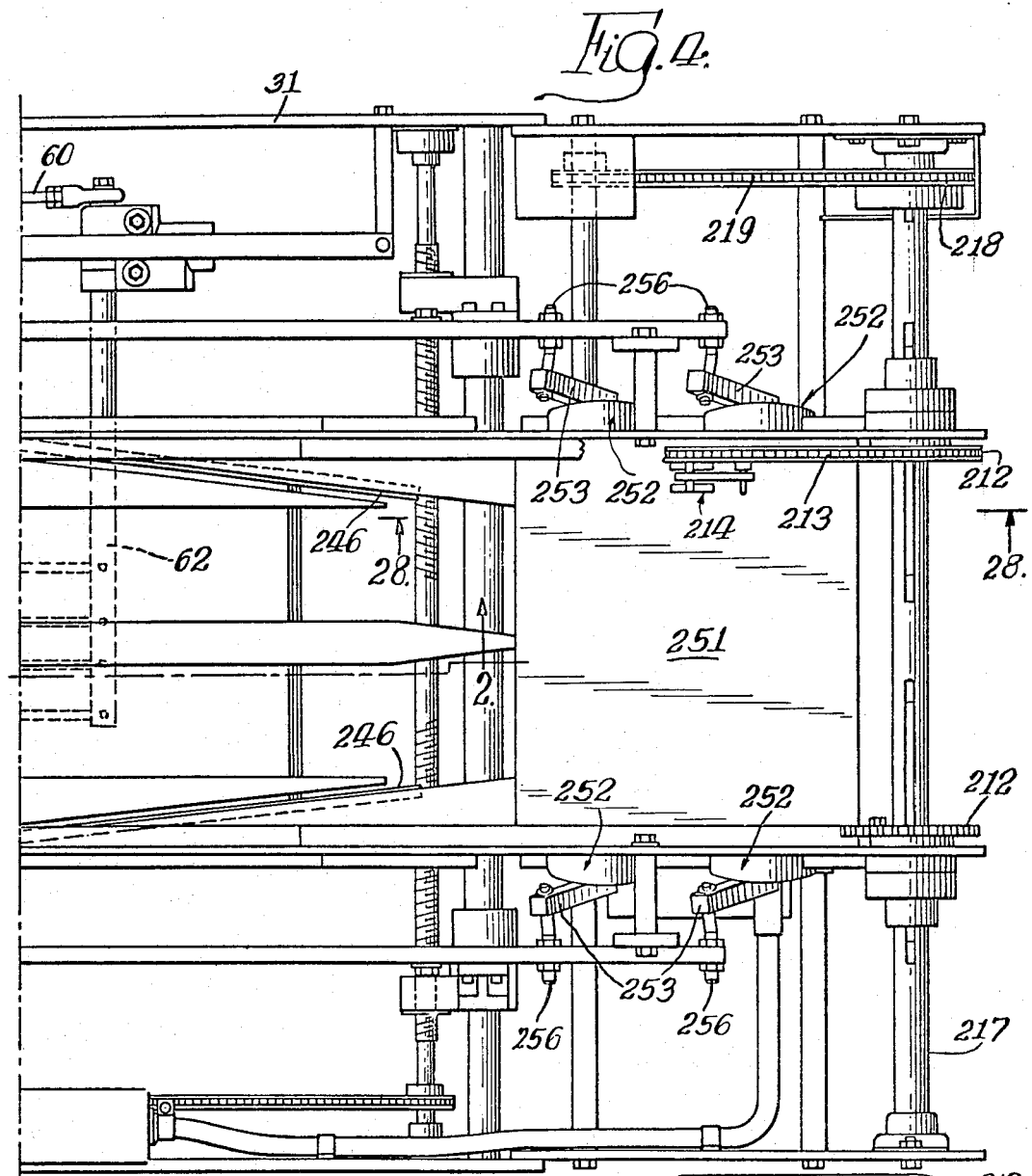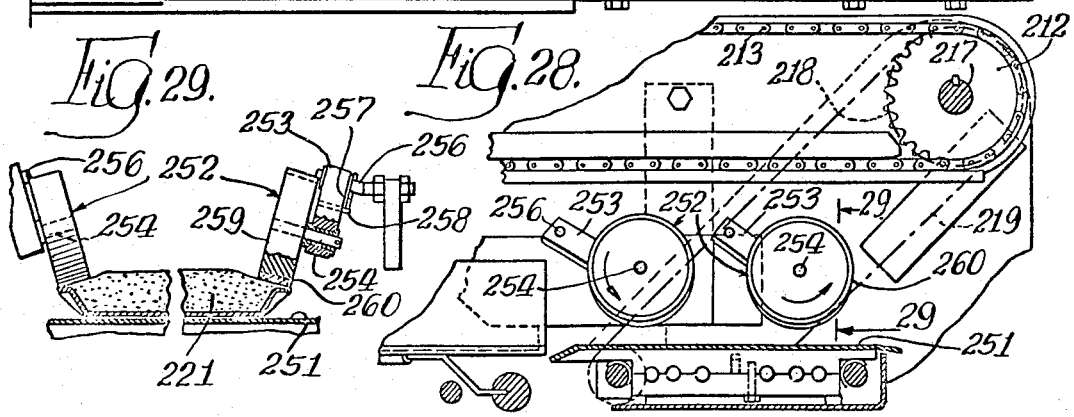

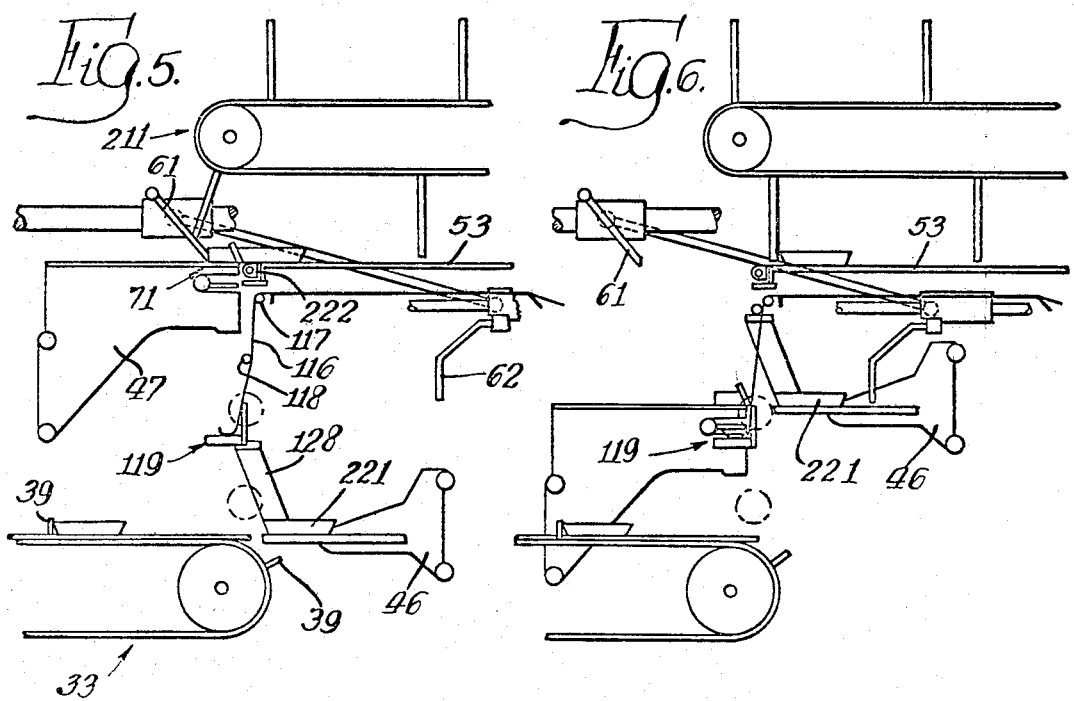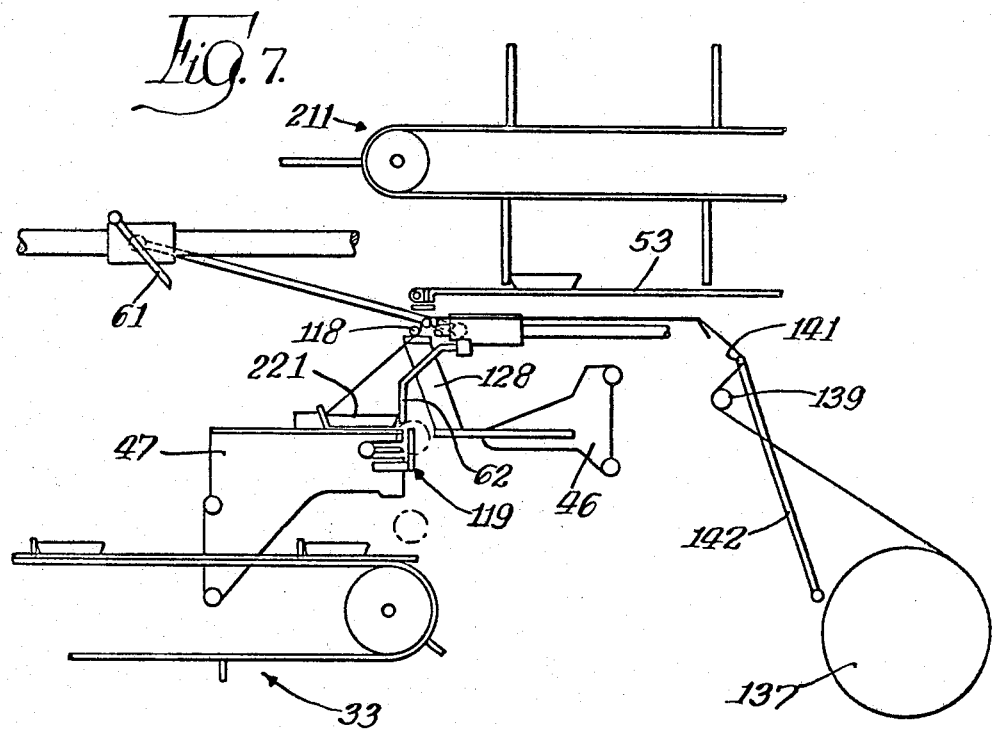

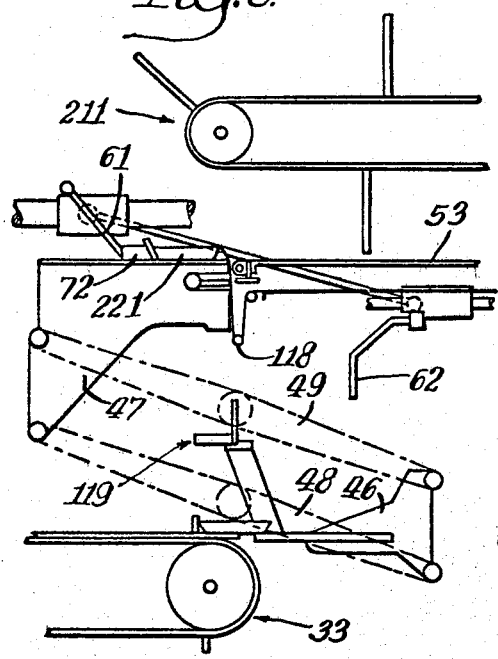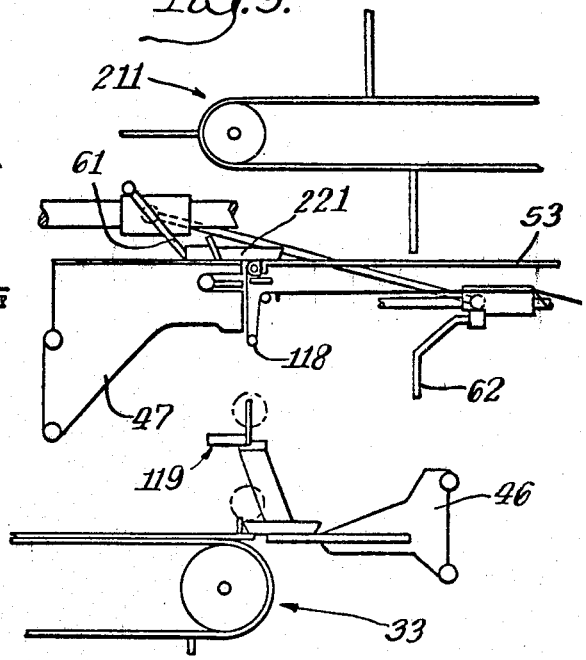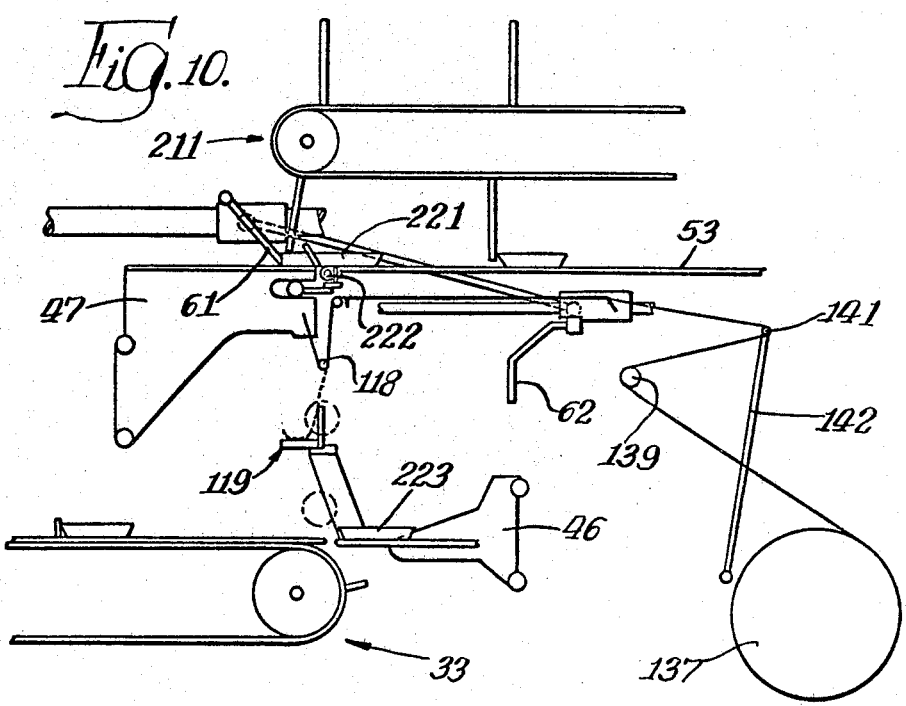

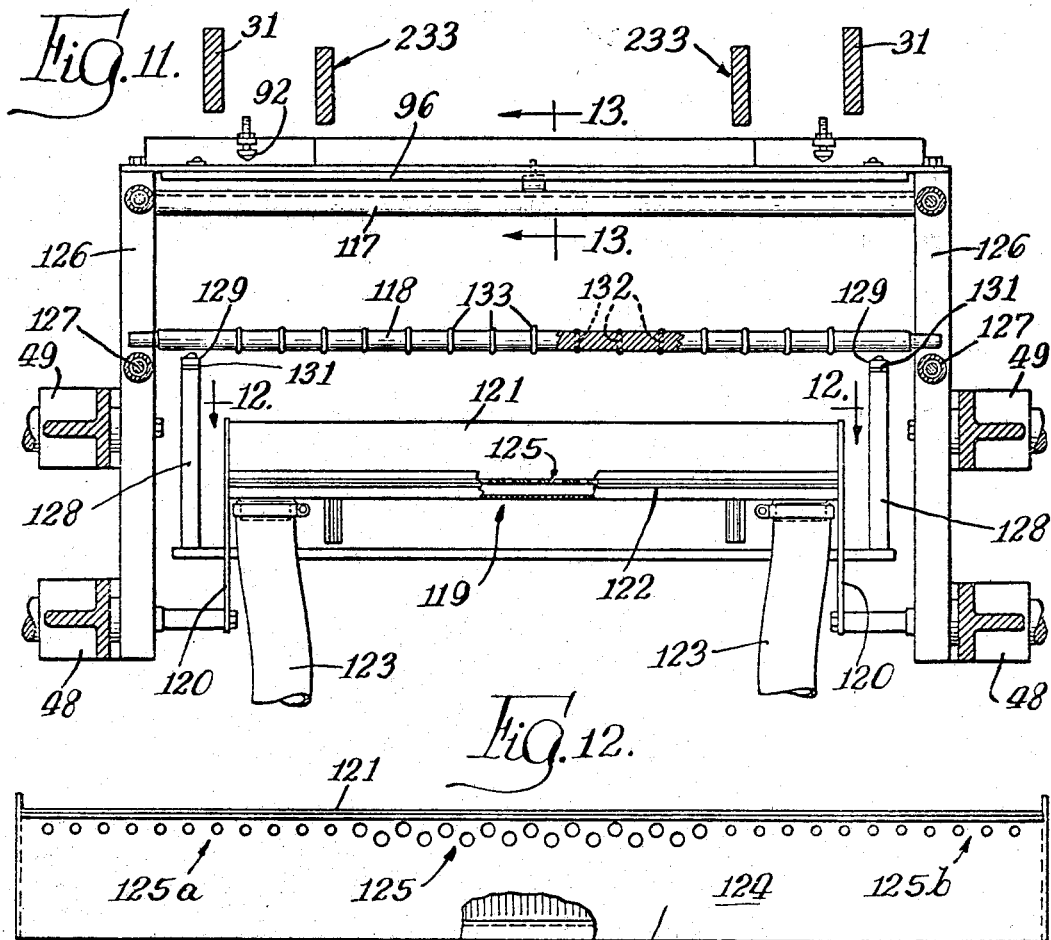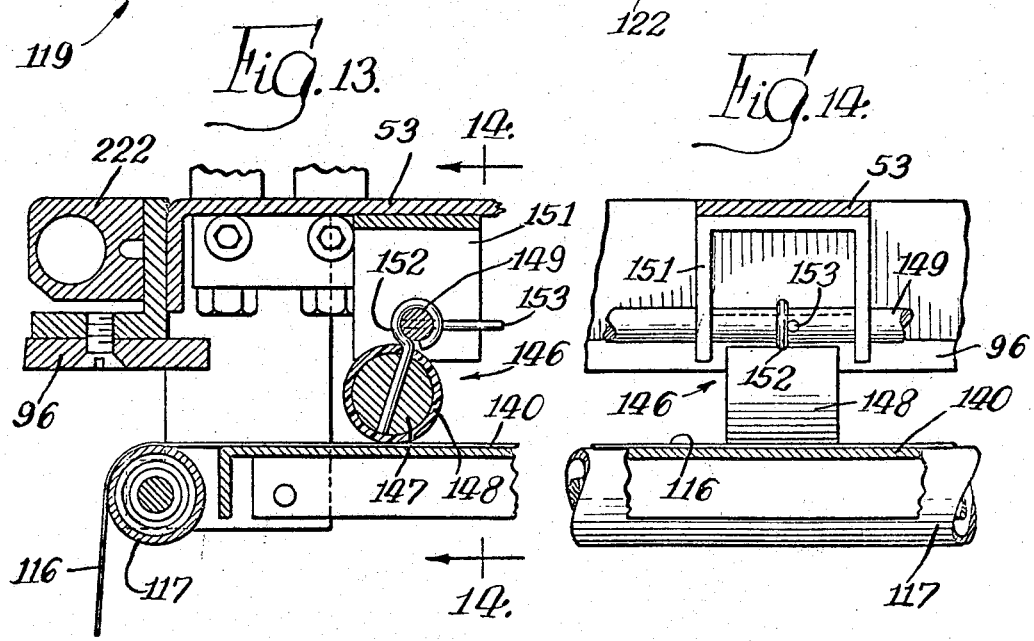

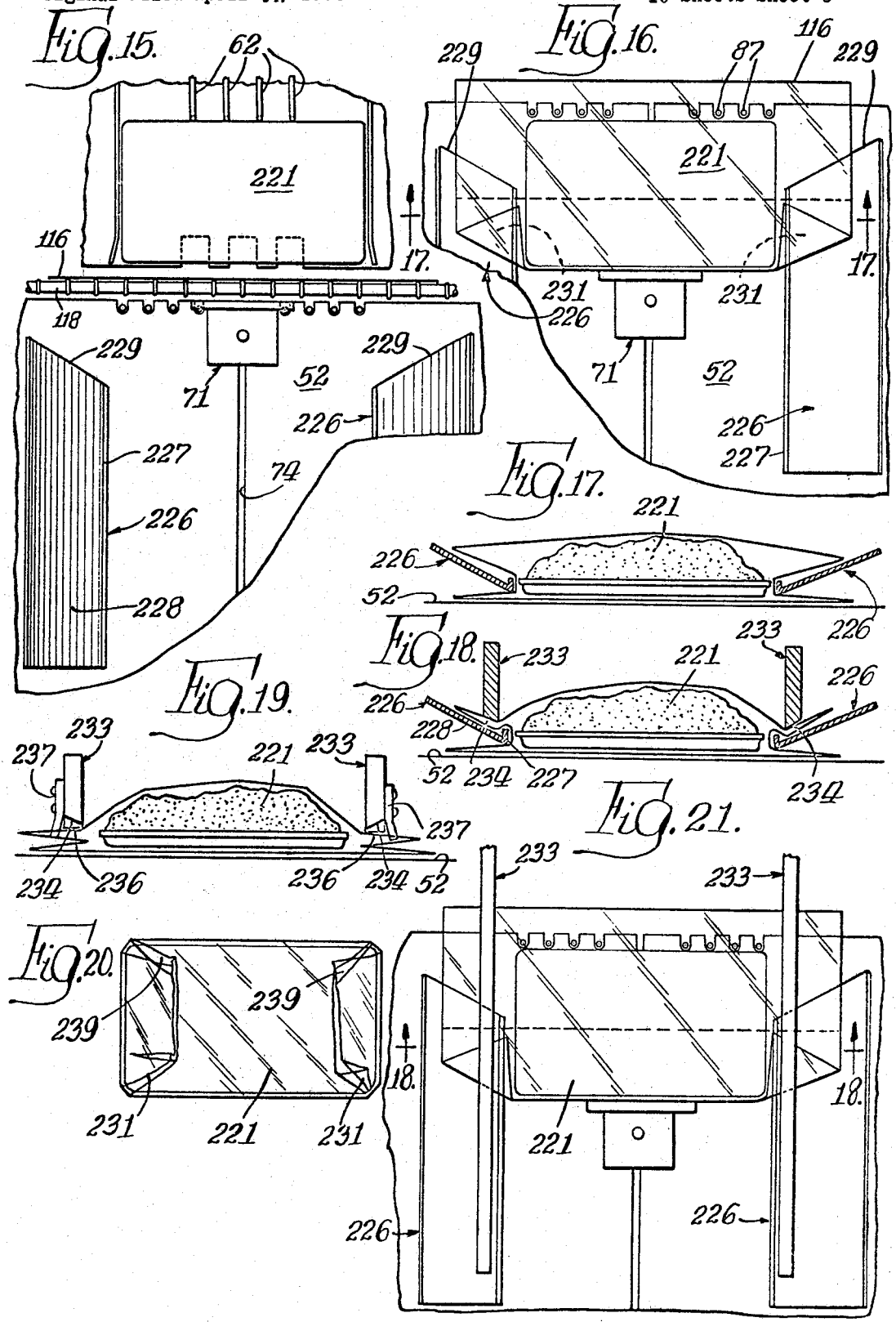

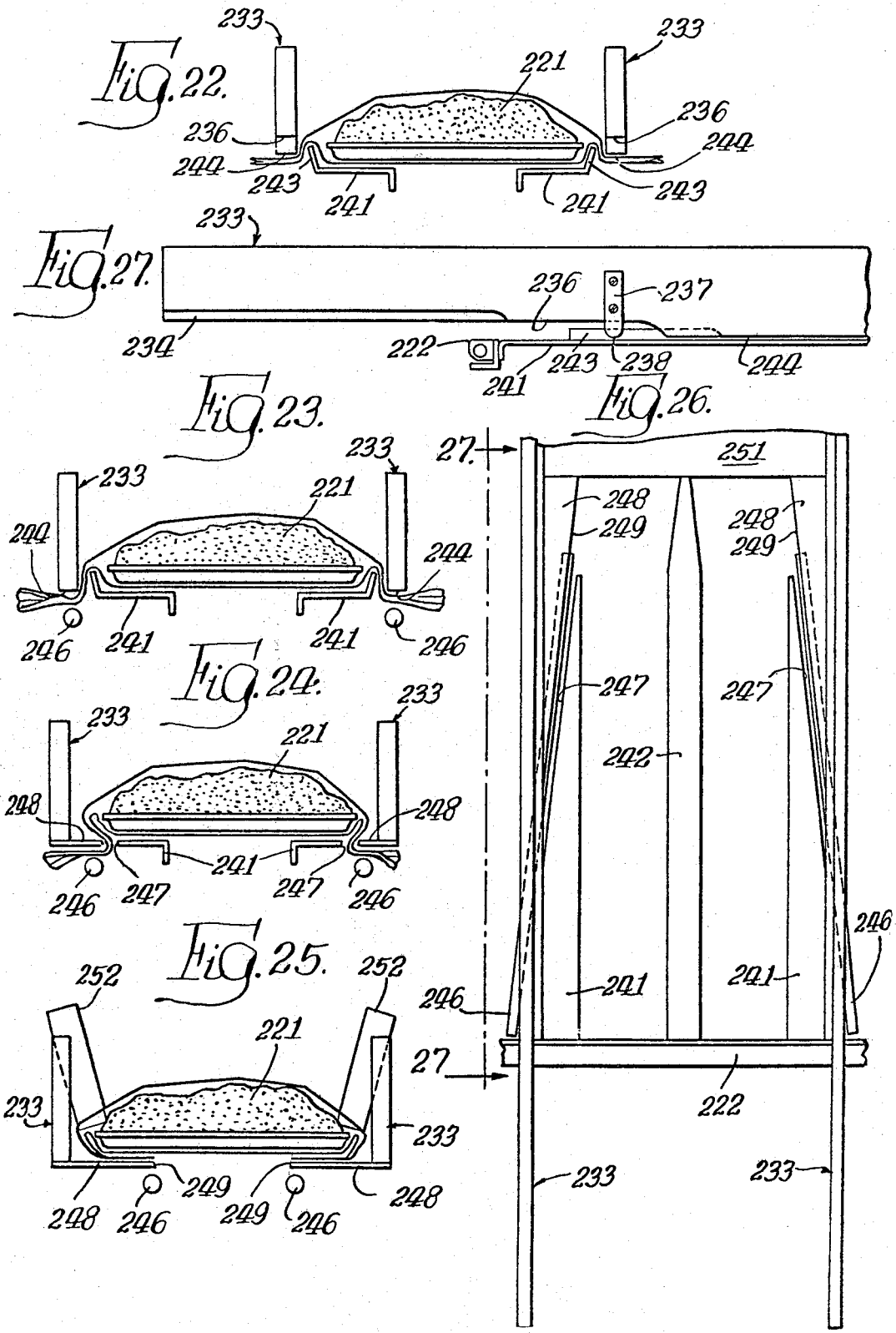

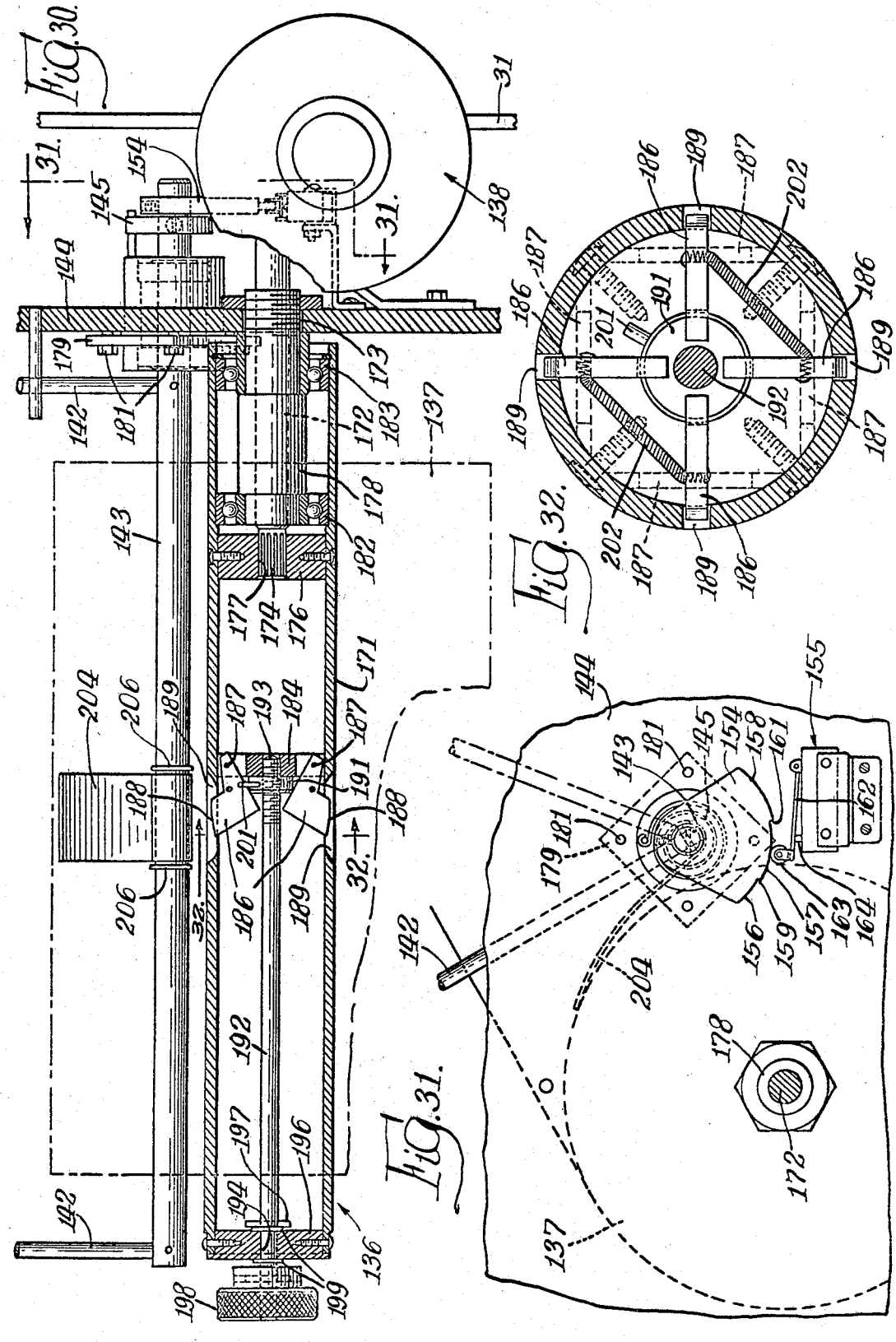

United States Patent Office 3,505,780
Patented Apr. 14, 1970

3,505,780
WRAPPING MACHINE
Omar Hansen, Jr., Carl Littlefield, and Allen R. Haddix, Bluffton, Ind., assignors to Franklin Electric Company, Inc., Bluffton, Ind., a corporation of Indiana
Original application Apr. 30, 1964, Ser. No. 363,954, now Patent No. 3,432,987, dated Mar. 18, 1969. Divided and this application Apr. 22, 1968, Ser. No. 738,753
Int. Cl. B65b 11/22, 51/16
U.S. Cl. 53—210       3 Claims

ABSTRACT OF THE DISCLOSURE

This disclosure deals with a wrapping machine for wrapping a series of items such as foodstuffs in a protective heat sealable film. An operator of the machine positions each item to be wrapped in a shallow tray and then inserts the article, consisting of the tray with the item therein, into the machine which folds a section of film about the article and folds the edges of the film underneath the article. The wrapped article is then moved across a heated element and pressed firmly against the element to seal the edges.

---

This application is a division of Hansen et al. copending application Ser. No. 363,954, filed Apr. 30, 1964 and entitled "Wrapping Machine" now Patent No. 3,432,987.

Littlefield Patent No. 3,248,848, issued May 3, 1966, discloses a wrapping machine including a wrapping mechanism and a film supply and transport mechanism for feeding film into the wrapping mechanism. The wrapping mechanism wraps the film about each article in a series of articles and hermetically seals the film. The device for hermetically sealing the film around each article comprises a heated element and a compressor assembly for pressing each article firmly against the element. The compressor assembly includes a vertically movable shoe and a cam actuated mechanism for moving the shoe downwardly to press an article against the heated element.

While the foregoing mechanism works well, it is disadvantageous in that pressure of the shoe is concentrated at the highest point on an article since the article is irregular in shape, and there is insufficient pressure at the side edges of the articles where pressure is needed most.

In accordance with the present invention, a wrapping machine is provided including means for wrapping an article in a section of heat sealable film and folding the edges of the section of film underneath the article. The article is then moved over a heated element, and pressure means comprising a plurality of pressure elements are provided on each side of the heater element to press the article against the heater element. Each pressure element is independently mounted for swinging movement in a slanted plane, and each pressure element is constructed to prevent an edge of an article from creeping upwardly on the pressure element.

FIG. 1 is a side elevational view of a wrapping machine embodying the invention;

FIG. 2 is an enlarged fragmentary sectional view taken on the line 2—2 of FIGS. 3 and 4;

FIGS. 3 and 4 are composite top elevational views of the wrapping machine;

FIGS. 5 through 10 are schematic views of a portion of the wrapping machine illustrating a wrapping cycle;

FIG. 11 is a fragmentary enlarged vertical sectional view taken substantially on the line 11—11 of FIG. 2;

FIG. 12 is a fragmentary enlarged view taken on the line 12—12 of FIG. 11;

FIG. 13 is an enlarged fragmentary view taken on the line 13—13 of FIG. 11;

FIG. 14 is an enlarged sectional view taken on the line 14—14 of FIG. 13;

FIGS. 15 to 25 are schematic views illustrating the operation of a portion of the wrapping machine;

FIG. 26 is a top elevational view of a portion of the wrapping machine;

FIG. 27 is a side elevational view taken on the line 27—27 of FIG. 26;

FIG. 28 is a fragmentary sectional view showing another portion of the wrapping machine;

FIG. 29 is a fragmentary sectional view taken on the line 29—29 of FIG. 28;

FIG. 30 is an enlarged fragmentary sectional view taken on the line 30—30 of FIG. 1;

FIG. 31 is a fragmentary side elevational view taken on the line 31—31 of FIG. 30;

FIG. 32 is an enlarged sectional view taken on the line 32—32 of FIG. 30.

In detail, the wrapping machine comprises a frame 30 including two laterally spaced plate like members 31 (FIGS. 1 to 4) connected by suitable braces 31a and mounted on wheels 32 for movement of the machine along the floor. Mounted on the frame between the plate like members 31 are an input mechanism indicated generally by the numeral 33, a wrapping mechanism indicated generally by the numeral 34, and a film supply and transport mechanism indicated generally by the numeral 36.

The input mechanism 33 is in the form of a chain conveyor and includes two pairs of sprockets 37 (FIGS. 1 and 2) and two laterally spaced chains 38 which mesh with the sprockets 37. Attached between the two input chains 38 are a plurality of pushers 39 which push an article placed between the chains rearwardly, or from left to right as seen in FIGS. 1 and 2, as the chains 38 and the pushers 39 are rotated in the clockwise direction. An article to be wrapped is placed on the upper surface of a plate 41 between guides 41a, at the front of the machine, and a pusher 39 pushes the article along the upper surface of the plate 41 and into the wrapping mechanism 34, as will be described in greater detail hereinafter. The chains 38 and the pushers 39 are rotated clockwise at a continuous steady rate for a given speed setting. A drive mechanism for the input mechanism 33 may be of the character described in the above mentioned patent application or any conventional drive. For example, the sprockets 37 may be secured to shafts 42 which may be rotatably mounted on the frame, and connected by a suitable chain and sprocket arrangement to a drive motor (not shown) also mounted between the two plate like members 31 of the frame below the input mechanism 33. It is preferred that the drive motor for the input mechanism 33 also be connected to operate the wrapping mechanism 34 so that the rate of rotation of the chains 38 of the input mechanism 33 will always be directly related to the rate of operation of the wrapping mechanism, and the two rates may be adjusted simultaneously.

The wrapping mechanism 34 comprises a bottom elevator 46 and a top elevator 47 which are supported by two pairs of arms or bars 48 and 49, one bar of each pair being shown in FIG. 2. One bar of each pair is pivotally connected to one side of each of the elevators 46 and 47, and at substantially their centers the bars 48 and 49 are also pivotally connected to the frame of the machine. At least one, and preferably both, of the lower bars 48 is also pivotally connected to a vertically extending link 50 which extends downwardly from the bar 48 and is connected to be moved substantially vertically in a reciprocating motion by a drive mechanism, which as previously stated is preferably the same drive mechanism as that provided for the input mechanism 33.

A suitable drive for the elevators 46 and 47 and bars 48 and 49 is described in the above mentioned patent application and comprises a cam which is connected to be rotated by a drive motor, and a cam follower which is connected by a suitable linkage to the link 50, the construction of the cam and the linkage being such that the link 50 is moved up and down.

Movement of the link 50 causes the two elevators 46 and 47 to swing between horizontally aligned positions and vertically displaced positions. The elevators 46 and 47 have substantially flat plates 51 and 52, respectively, which are always horizontal because the bars 48 and 49 form parallel arms, and when the elevators are in the horizontally aligned positions, the plates 51 and 52 are at substantially the same level, as shown in FIG. 6. When the elevators 46 and 47 are at the vertically displaced positions, the upper surface of the plate 51 is substantially at the level of the upper surface of the plate 41 of the input mechanism 33, as indicated fragmentarily in dashed lines in FIG. 2, and the upper surface of the plate 52 of the top elevator 47 is substantially at the level of a plate 53 of an end folding and sealing means 54 of the wrapping mechanism 34. The positions of the elevators shown in FIGS. 1 and 2 is intermediate the horizontally aligned and vertically displaced positions.

A suitable safety device may be incorporated in the construction of the link 50, which preferably will automatically deenergize the drive motor for the wrapping mechanism and the input mechanism in the event an article is jammed during the movement of the elevators. A high package safety device is preferably also provided above the input mechanism 33 to turn off the machine in the event an overly high package is fed into the machine.

The wrapping mechanism further includes plunger means for moving an article being wrapped from the bottom elevator 46 to the top elevator 47 when the two elevators are in their horizontally aligned positions, and also for moving the article from the top elevator 47 to the plate 53 when the two elevators are in their vertically displaced positions. The plunger means comprises a bell crank arrangement including a bracket or crank 56 (FIGS. 2 and 3) which is pivotally mounted by means of a pin 57 on the frame of the machine, a link 58 which connects one end of the crank 56 to the previously mentioned drive mechanism, and a pair of links 59 and 60 connected to the other end of the crank 56 which operate a top plunger 61 and a bottom plunger 62. The drive mechanism construction and its connection to the link 58 is such that the link 58 is periodically moved up and down. A cam and cam follower arrangement of the character described in the previously mentioned patent application may be provided for this purpose. The link 59 is connected to a slider 63 which is mounted on a suitable guide means 64 and carries the top plunger 61. The link 60 is connected to another slider 65 which is mounted on a guide 66 and carries the bottom plunger 62. Vertical movement of the link 58 causes horizontal movement of the sliders 63 and 65 and the plungers 61 and 62. The cams for operating the plungers 61 and 62 and the elevators 46 and 47 are constructed such that the movement of the plungers is synchronized with the movement of the two elevators, the plungers 61 and 62 moving toward the left, or forwardly as seen in FIG. 2, and the plunger 62 pushing an article from the bottom elevator 46 to the top elevator 47 when the two elevators are in their horizontally aligned positions, and the two plungers moving toward the right, or rearwardly, and the plunger 61 pushing an article from the top elevator 47 to the plate 53 when the two elevators are in their vertically displaced positions.

The bottom plunger 62 is preferably in the form of a rake, having a plurality of downwardly extending teeth (FIGS. 3 and 4) which sweep across the upper surface of the plate 51 of the bottom elevator 46 and engage the rearward edge of an article being wrapped. The top plunger 61 may be a simple rod like member which angles downwardly and rearwardly as shown in FIG. 2, the lower end of the plunger 61 being at substantially the lateral center of the plate 52 of the top elevator 47. The top elevator 47 is preferably provided with a floating receiver bar 71 which is mounted such that it is able to move longitudinally of the machine at substantially the lateral center of the plate 52. The receiver bar 71 comprises a generally rectangular block 72 having a vertically extending hole formed therethrough which receives a bolt 73. The bolt 73 extends through a longitudinally extending slot 74 (FIG. 3) formed in the plate 52, and a compression spring 76 is preferably positioned between the top side of the block 72 and a nut 77 which is threaded on the bolt 73. It will be apparent that when the nut 77 is tightened on the bolt 73, the spring 76 will be compressed and force the block 72 more tightly against the plate 52 of the top elevator 47, thereby increasing the frictional engagement between the block 72 and the plate 52. To reduce the amount of force required to slide the block 72 across the plate 52, the nut 77 is simply backed off somewhat thereby reducing the compressive force exerted by the spring 76 on the block 72. An angle shaped bracket 78 is secured to the rearward side of the block 72, one arm of the bracket 78 extending generally vertical and the other arm of the bracket 78 being positioned to extend under the bottom of an article being wrapped adjacent its forward edge. As will be described hereinafter, the film being wrapped about the article is caught between the bracket 78 and the article, and, to increase the frictional force between the bracket 78 and the film, it is preferred that a layer 79 of high friction material, such as polyester foam, be secured to the face of the bracket 78 which engages the article.

When the article being wrapped is pushed by the plunger 62 from the bottom elevator 46 to the top elevator 47, the forward edge of the article pushes the receiver bar 71 forwardly and, subsequently, when the article is to be pushed by the plunger 61 from the top elevator 47 to the plate 53, the plunger 61 engages the block 72 and pushes the receiver bar 71 and the article toward the right until the article is deposited on the plate 53.

During a wrapping cycle, when the top elevator 47 is moving upwardly with an article on the plate 52, the film is stretched tightly across the upper surface of the article, and there is a tendency for the taut film to pull the article rearwardly off the plate 52 of the top elevator 47. To prevent the article from being pulled by the film off of the top elevator 47, a rake-like bracket 86 (FIG. 2) is provided having a plurality of generally vertical stop fingers 87 (FIGS. 2 and 3) which are adjacent the rearward edge of the plate 52. The bracket 86 is mounted underneath the plate 52 for pivotal movement relative to the top elevator 47 by means of a shaft 85 and a tension spring 88 connected between the arm 49 and the end of the bracket 86 opposite from the fingers 87 urges the bracket 86 in the counterclockwise direction as seen in FIG. 2. Through the action of the spring 88, the bracket 86 is normally in the position shown in FIG. 2 where the fingers 87 extend through slots 89 formed in the rear edge of the plate 52, the ends of the fingers 87 extending upwardly above the upper surface of the plate 52. The fingers 87 must of course be retracted below the upper surface of the plate 52 when an article is being transferred on to or off of the plate 52, and, for this purpose, a bottom actuator 91 and a top actuator 92 are provided. The bottom actuator 91 is mounted on the plate 41 of the input mechanism 33 and extends upwardly therefrom at a position where it engages the bracket 86 forwardly of the shaft 85 and thereby rotates the bracket 86 in the clockwise direction to retract the fingers 87 when the top elevator 47 is aligned with the bottom elevator 46. The height of the upper end of the actuator 91 is adjusted such that the bracket 86 will be pivoted just sufficient to lower the fingers 87 below the upper level of the plate 52. When the top elevator 47 is moved upwardly with an article thereon, the bracket 86 moves out of engagement with the actuator 91 and the fingers 87 move upwardly, and the article is held between the fingers 87 and the receiver bar 71. When the elevator 47 reaches its uppermost position, the top actuator 92 engages the bracket 86 rearwardly of the shaft 85 and pivots the bracket 86 clockwise which also causes the fingers 87 to be retracted below the upper level of the plate 52, thereby permitting the article to be pushed off of the top elevator 47 on to the plate 53. Of course, as soon as the elevator 47 moves downwardly, the bracket 86 is moved out of engagement with the top actuator 92 and the fingers again extend upwardly above the upper surface of the plate 52.

The wrapping mechanism 34 further includes scissor-like means for severing the film after it has been wrapped around an article. The severing means comprises a horizontal laterally extending stationary blade 96 which is fixed to the frame just below and forwardly of the forward edge of the plate 53. The severing means further includes a pair of movable blades 97 carried by the top elevator 47 on the underside thereof. The blades 97 are carried by brackets 98 (FIG. 2) and extend laterally of the machine and are in end-to-end relation, the two blades 97 forming a V (see FIG. 3) with the apex of the V being toward the left and at substantially the lateral center of the top elevator 47. From the apex, each of the blades 97 extends laterally of the machine and rearwardly, and each of the blades also slopes downwardly a slight amount from its apex. When the top elevator 47 moves to its uppermost position, the outer ends of the blades 97 contact the underside of the stationary blade 96, and when the brackets 98 carrying the blades 97 are moved rearwardly, the downward and rearward slant of each of the blades 97 causes each of the blades 97 to be in point contact only with the stationary blade 96. Such point contact between each blade 97 and the stationary blade 96 may be referred to as a scissors action which is desirable because it prevents tearing or pulling of the film being severed.

The brackets 98 which carry the movable blades 97 are mounted for pivotal movement relative to the top elevator 47 by a rod 99 which is fastened to the top elevator 47, and a tension spring 101 connected between the forward end of each bracket 98 and the arm 49 urges the brackets 98 and the movable blades 97 in the counterclockwise direction as seen in FIG. 2. The rod 99 is mounted for longitudinal movement relative to the top elevator 47 by suitable means, and each end of the rod 99 is secured to an actuating arm 102, each arm 102 extending forwardly from the rod 99 along one side of the top elevator 47. The forward end of each actuating arm 102 has a cam follower 103 secured thereto, and the cam follower 103 fits within a groove 104 formed within a generally vertical arcuate cam member 106. At its lower end, each cam member 106 is secured to a laterally extending shaft 107 which in turn is pivotally mounted on the frame of the wrapping machine, and it will be apparent that when the shaft 107 is pivoted slightly in the clockwise direction as seen in FIG. 2, the upper end of the cam members 106 will be moved slightly toward the right and cause similar movement of the actuating arms 102 and also the movable blades 97 of the severing means. To cause such pivotal movement of the shaft 107, an arm 108 is secured to the shaft 107 and extends forwardly therefrom, and a link 109 is pivotally connected to the forward end of the arm 108 and extends downwardly therefrom to the drive mechanism. Another cam device may be provided in the drive mechanism for causing periodic upward and downward movement of the link 109, such movement being timed to occur when the top elevator 47 and the cutting blades 97 are at their uppermost position and the film is to be severed. As shown in FIG. 2, the cam members 106 are made arcuate because the top elevator 47 and the actuating arms 102 travel in a swinging movement as the arms 48 and 49 pivot, the cam followers 103 sliding up and down in the grooves 104 during this swinging movement.

The film, indicated by the numeral 116, for wrapping an article, is delivered to the wrapping mechanism 34 by the film supply and transport mechanism 36 to be described in greater detail hereinafter, and passes over a stationary roller 117 (FIGS. 2 and 13) mounted on the frame and extending laterally thereof just below the stationary cutting blade 96 of the severing means. When the wrapping machine is idling between packages, the film 116 hangs downwardly from the roller 117 and passes rearwardly of a dancer roll 118 (FIGS. 2 and 11), and the lower or free end of the film 116 is held by a suction baffle plate 119 (FIGS. 2, 11 and 12). The baffle plate 119 extends laterally of the machine and is secured to the frame by brackets 120, and comprises a vertically extending back 121 and a horizontal shelf 122 which extends forwardly from the lower edge of the back 121. The shelf 122 has a hollow interior which forms a suction box, each end of the shelf 122 being connected by a length of hose 123 to means, such as a motor driven fan, 123a for producing a partial vacuum. The top side 124 of the shelf 122 has three sets 125, 125a and 125b of holes formed therein, and air is drawn into the interior of the shelf 122 through the holes. The suction draws the film 116 to the shelf 122 and holds the lower or free end of the film 116 flat against the shelf 122, thereby preventing curling of the free end of the film 116.

The pattern of the holes 125, 125a and 125b shown in FIG. 12 is designed to provide effective holding of film of a variety of widths. The holes 125 extend over the center one-third of the shelf 122, and have a larger diameter and are more numerous than the holes 125a and 125b. Thus, if a relatively narrow width film is used which covers only the holes 125, there will not be a substantial pressure drop because the total area of the holes 125a and 125b is relatively small. The latter holes are large enough however to hold the edges of a relatively wide film. A partial vacuum on the order of 1.5 inches Hg has been found satisfactory.

The dancer roll 118 also extends laterally of the machine and is mounted between two pairs of vertically extending guides 126 (FIGS. 2 and 11) the guides permitting free movement of the dancer roll 118 in a vertical direction. The dancer roll 118 normally rests on a stop 127 secured between the two guides 126 of each pair. Since the dancer roll 118 might be in the way when an article is to be transferred from the bottom elevator 46 to the top elevator 47, a lifter arm 128 is secured to each side of the bottom elevator 46 and positioned to raise the dancer roll 118 upwardly between the guides 126 sufficiently high to permit the article to be transferred from the bottom elevator 46 to the top elevator 47. This action is shown, for example in FIGS. 8 and 9. The position of the stops 127 for the dancer roll 118 must be adjusted so that, after an article has been wrapped and the film severed, the length of the film from the lower side of the dancer roll 118 to the severing means must be sufficiently long to permit the free end of the film to fall down and be caught by the suction baffle plate and thereafter extend under the forward edge of the next article to be wrapped.

A piece of neoprene 129 is preferably secured to the upper end of each lifter 128. It has been found that repeated impact between the piece of neoprene 129 and the dancer roll 118 each time the bottom elevator 46 is moved upwardly causes fairly rapid deterioration of the neoprene 129. This may be prevented by inserting a layer 131 of very resilient material such as polyester foam between the upper end of each lifter 128 and the neoprene 129, the layers 131 absorbing the shock of impact between the dancer roll 118 and the neoprene 129 and greatly prolonging the life of the neoprene 129.

The dancer roll 118 is preferably made of metal, and some types of film tend to cling to the dancer roll 118 due to static electricity. This may be prevented by forming a plurality of circumferential grooves 132 (FIG. 11) at axially spaced locations, and positioning a rubber O-ring 133 in each groove 132. The outer diameter of the O-rings 133 is greater than the diameter of the portion of the dancer roll 118 between the grooves 132, and the O-rings hold the film 116 away from the metal and thereby prevents the previously mentioned clinging.

The film supply and transport mechanism 36 comprises an arbor 136 (FIGS. 2 and 30) for supporting a supply roll 137 of film, the arbor 136 being connected to be driven by a motor-gear box 138. The path of the film from the supply roll 137 extends around an idler roller 139, around a tension roller 141, over the top of a generally horizontal film support plate 140, and over the roller 117, previously described. The idler roller 139 is mounted between the plates 31 of the frame, and the tension roller 141 extends laterally of the machine and is rotatably mounted between the upper ends of two laterally spaced swing arms 142. The two swing arms 142 are secured to a shaft 143 which extends laterally of the machine and is rotatably mounted on a plate 144 of the frame of the machine. The plate 144 is generally parallel to one of the plates 131 and is laterally spaced a short distance therefrom, and the arbor 136 and the shaft 143 are cantilevered from one side of the plate 144 and the motor 138 is mounted on the opposite side of the plate 144. Means, such as a torsion spring 145 (FIGS. 30 and 31) is connected to the shaft 143 and the plate 144 and constantly urges the shaft 143, and of course the swing arms 142, in the clockwise direction, as seen in FIG. 1.

The film supply and transport mechanism 36 further includes a film check valve 146 (FIGS. 2, 13 and 14) mounted above the plate 142 adjacent the roller 117, the check valve 146 permitting forward movement of the film 116 only, unless it is disengaged. The check valve 146 comprises a relatively heavy metal cylinder 147 which is preferably wrapped in a layer 148 of high friction material such as the previously mentioned polyester foam. The cylinder 147 is suspended from a laterally extending rod-like valve handle 149 which extends outside the frame of the machine and is turned at a right angle to form a handle (FIG. 1), the handle 149 being rotatably held by a bracket 151 secured to the underside of the plate 53 at substantially the lateral center of the machine. An eye bolt 152 is secured to the cylinder 147 and the handle 149 extends loosely through the eye of the bolt 152. The handle 149 is sufficiently close to the plate 140 that the cylinder 147 rests on the film on top of the plate 140, and the eye bolt 152 carrying the cylinder 147 normally extends forwardly from the handle 149, and the weight of the cylinder is sufficient to prevent the film 116 from being pulled rearwardly. To disengage the valve, a pin 153 is secured to the handle 149 adjacent the cylinder 147, and when the handle 149 is pivoted clockwise as seen in FIG. 1, the pin 153 engages the cylinder 147 and swings it forwardly and upwardly out of engagement with the film, permitting the film 116 to be pulled rearwardly.

When the wrapping machine is idling between packages, the free end of the film 116 is held by the baffle plate 119 as previously described, and the arbor 136 and the supply roll 137 are held against rotation by the motor and gear box unit 138. A constant and uniform tension is maintained on the length of film 116 between the supply roll 137 and the film check valve 146 by the swing arms 142 which, as previously explained, are constantly urged in the clockwise direction as in FIG. 1 by the torsion spring 145. After an article is fed into the wrapping mechanism and a wrapping cycle begins, the film 116 is pulled forwardly during the wrapping operation and the swing arms 142 swing in the counterclockwise direction as seen in FIG. 1. At a predetermined angle of the swing arms 142, a cam 154 (FIGS. 30 and 31) secured to the shaft 143 actuates a switch mechanism 155 which controls the drive unit 138. The cam 154 has three cam surfaces 156, 157 and 158 (FIG. 31), each being an arc having the axis of the shaft 143 as its center. The surface 157 is between the surfaces 156 and 158 and its radius is intermediate the radii of the surfaces 156 and 158. The juncture 159 of the surfaces 156 and 157 is referred to as the "off" point and the juncture 161 of the surfaces 157 and 158 is referred to as the "on" point.

The switch mechanism 155 includes a pivotally mounted actuating arm 162 having a roller 163 at its free end, the roller 163 engaging the surfaces 156 to 158. The mechanism 155 further includes a button 164 which is actuated by movement of the arm 162.

When film is demanded during a wrapping cycle, the arms 142 and the cam 154 are pulled by the film clockwise as seen in FIG. 31. When the roller 163 is engaged by the on point 161, the motor drive unit 138 is turned on by the switch mechanism 155, causing the supply roll 137 to be rotated and feed additional film. After the film has been wrapped lengthwise about the article and the film has been severed, the check valve 146 prevents the film 116 from being pulled back but the drive unit 138 for the supply roll 137 continues to be energized. As additional film is unrolled, the tension arms 142 swing in the counterclockwise direction as seen in FIG. 31 and when the off point 159 of the cam 154 passes the roller 159 of the switch mechanism 155, the drive unit 138 is deenergized. Dynamic braking causes the motor to stop almost instantly.

In summary, when the cam 154 pivots clockwise as seen in FIG. 31, the switch mechanism 155 is turned on at the on point 161 and on opposite pivotal movement, the mechanism 155 is turned off at the off point 159. The cam surface 157 between the points 159 and 161 may be referred to as a storage differential area. In addition to the described advantages, the construction also eliminates off center film tracking problems and jerks from sudden pulling of the film, and is able to pay out a number of types of film without distortion.

The arbor 136 for the supply roll 137 and the mounting of the arbor on the plate 144 is illustrated in FIG. 30. The arbor 136 comprises a cylindrical tube 171, the outer diameter of which is slightly less than the inner diameter of the supply roll 137 so that the roll 137 may be easily slipped over the tube 171. The drive unit 138 includes a drive shaft 172 which extends through an opening 173 formed in the plate 144, and the tube 171 is positioned coaxially over the drive shaft 172. The end of the shaft 172 is splined at 174, and a mounting plate 176 secured to the interior of the tube 171 has a splined center opening 177 which mates with the splined end 174 of the shaft 172, so that, when the drive unit 138 is energized, the tube 171 will rotate with the drive shaft 172.

The tube 171 is rotatably mounted on the plate 144 by means of a bearing housing 178 in the form of a sleeve, which is positioned around the portion of the drive, shaft 172 between the two plates 144 and 176, and the bearing housing 178 is secured to the plate 144 by a collar 179 and bolts 181 (FIG. 31). The tube 171 is rotatably mounted on the bearing housing 178 by two ball bearing units 182 and 183, the inner race of each unit 182 and 183 being secured to the housing 178 and the outer race of each unit being secured to the inner periphery of the tube 171. Thus, the tube 171 is free to rotate relative to the housing 178 and the plate 144 due to the ball bearing units, and it is driven by the drive unit 138 and the drive shaft 172 which extends through the bearing housing 178 and connects to the plate 176.

Means is also provided for securing the supply roll 137 to the tube 171 for rotation therewith, comprising a toggle mounting plate 184 which is secured to the inner periphery of the tube 171 at approximately its longitudinal center. Four fingers 186 (FIGS. 30 and 32) are pivotally connected to the mounting plate 184 by pins 187, each finger 186 including a knurled outer surface 188 adapted to extend outwardly of the tube 171 through four slots 189 formed in the tube 171. The apparatus further includes means for forcing the fingers 186 radially outward into tight engagement with the inner periphery of the supply roll 137 when the roll 137 is to be held, and for retracting the fingers 186 in order to release the supply roll 137. This means comprises a nut 191 which is threaded on the end of a threaded rod 192, the outer periphery of the nut 191 being adapted to engage the radially inner surface of each finger 186. The rod 192 is positioned in a hole 193 formed in the mounting plate 184 and is free to rotate relative to the plate 184, and the other end of the rod 192 is rotatably positioned in a hole 194 formed in a cap 196 secured within the free end of the tube 171. The rod 192 is prevented from moving axially relative to the cap 196 by a roll pin 197 and a knurled knob 198, the pin 197 and the knob 198 being secured to the rod 192 on opposite sides of the cap 196. Thrust washers 199 are preferably positioned on both sides of the cap 196.

When the rod 192 is rotated in one direction by manually turning the knob 198, the nut 191 begins to turn with the rod 192 due to friction but a stop pin 201 secured to the nut 191 and extending radially outward therefrom engages one of the fingers 186 and thus prevents further rotation of the nut 191. The nut 191 then moves axially of the rod 192 to the left as seen in FIG. 30 and forces the fingers 186 outwardly and the knurled surfaces 188 into tight engagement with the inner periphery of the supply roll 137.

When the roll 137 is to be removed from the arbor 136, the knob 198 and rod 192 are turned in the opposite direction and the nut 191, after turning through an arc of approximately 90 degrees and the pin 201 engaging another of the fingers 186, moves axially toward the right as seen in FIG. 30 thereby releasing the outward pressure on the fingers 186. Two springs 202 are provided, one spring 202 being secured to two adjacent fingers 186 and the other spring being secured to the other two fingers, and the springs 202 draw the outer ends of the fingers 186 radially inward as the nut 191 moves to the right.

Thus, a supply roll 137 may be removed from the arbor simply by rotating the knob 198 to retract the fingers and then pulling the supply roll 137 off the end of the arbor, and a fresh roll may be mounted on the arbor by sliding it over the tube 171 and again turning the knob 198 to extend the fingers 186. As shown in FIG. 1, a plurality of rods may be secured to the plate 144 for mounting a plurality of spare supply rolls 203 at a convenient location on the machine. The supply rolls may be of a diffieent material or they may differ in their lateral width. A plurality of marks (not shown) are preferably formed on the outer surface of the tube 171 to help center a supply roll 137 axially on the arbor.

Since some types of film materal tend to cling together due to static electricity or other causes, a film lifter 204 (FIGS. 1, 30 and 31) is loosely mounted on the shaft 143 at substantially its axial center. The lifter 204 may be simply a generally rectangular plate 204 having one end bent around the shaft 143 and its other or free end bent to generally the curvature of the supply roll 137. The lifter 204 may be prevented from moving axially along the shaft 143 by two rings 206 which are secured to the shaft 143 on opposite sides of the lifter 204. The free end of the lifter 204 is permitted to slide on top of the supply roll 137 as it is rotated, underneath the outer layer of the film 116 which is being pealed off, thereby preventing the outer layer of the film from clinging to the remainder of the roll.

The wrapping mechanism 34 further includes the end folding and sealing means 54, such means including a longitudinally extending top conveyor 211 for moving articles across the plate 53, the plate 53 also forming part of the end folding and sealing means. The top conveyor 211 is mounted on the frame of the machine over the top of the plate 53 and comprises two pairs of laterally spaced sprockets 212 (FIGS. 2 to 4), the sprockets 212 carrying two chains 213. Each chain 213 carries a series of longitudinally spaced apart transport arms 214, the arms 214 of the two chains forming laterally aligned pairs, and the lower ends of the transport arms 214 sweep across the upper surface of the plate 53 when the arms 214 are in the rearward moving portion of their cycle. The chains and the arms are rotated in the counterclockwise direction as seen in FIG. 2, and after an article has been pushed from the top elevator 47 onto the plate 53 by the top plunger, the article is picked up by a pair of the transport arms 214 and pushed rearwardly across the plate 53 to an output conveyor 216 (FIG. 1).

With reference to FIG. 4, the sprockets 212 are mounted on shafts 217 for rotation on the frame of the machine, and another sprocket 218 may be secured to one of the shafts 217 and be connected to a drive unit by another chain 219. The sprockets 212 and the chains 213 are driven continuously at a rate that is directly related to the speed of operation of the wrapping mechanism. The arms 214 are positioned such that a pair of arms pick up each package after it has been deposited on the plate 53 by the top plunger. The drive unit for the chains 219 is preferably the same one as for the infeed conveyor 33, the wrapping mechanism 34, the plungers 61 and 62, and the severing means, so that the rate of operation of all of these mechanisms will always be directly related and all may be adjusted by simply adjusting the speed of a single drive unit. Such a drive unit however is preferably separate from the drive unit 138 for the film feed and the previously mentioned motor for the fan connected to the suction baffle plate 119.

FIGS. 5 to 10 illustrate the portion of a wrapping operation cycle wherein the film is wrapped lengthwise around an article, indicated by the numeral 221. An operator of the machine places the article on the infeed conveyor mechanism 33 and one of the pushers 39 pushes the article 221 onto the bottom elevator 46. FIG. 5 shows the condition of the machine just after the article 221 has been placed on the bottom elevator 46, the elevators 46 and 47 being in their vertically displaced positions. After the article 221 has been placed on the bottom elevator 46, the bars 48 and 49 swing in the counterclockwise direction as seen in FIG. 2 and move the elevators 46 and 47 to their horizontally aligned positions, shown in FIGS. 6 and 7. As soon as the elevators 46 and 47 reach the horizontally aligned positions, the plunger mechanism is shifted forwardly and the bottom plunger 62 sweeps across the plate 51 of the bottom elevator 46 and pushes the article 221 forwardly, causing the forward edge of the article 221 to contact the suspended length of the film 116 and slide over the free end of the film as it moves onto the top elevator 47. The receiver bar 71 is initially adjacent the rearward edge of the top elevator 47, and the film 116 is caught between the article 221 and the receiver bar 71, and continued movement of the article 221 forwardly on the top elevator causes additional film 116 to be pulled into the wrapping mechanism, the swing arms 142 swinging as previously explained. The receiver bar 71 is pushed forwardly by the article 221. FIG. 6 shows positions of the article 221 and the elevators just before the article is pushed from the bottom elevator onto the top elevator, and FIG. 7 shows the position of the article 148 after it has been pushed completely on the top elevator 47. The dancer roll 118 has been lifted upwardly by the two lifts 128 to permit the article 221 to be transferred from the bottom elevator to the top elevator.

After the article 148 has been transferred to the top elevator 47, the bars 48 and 49 swing in the clockwise direction and shift the elevators 46 and 47 to their vertically displaced positions (FIG. 8). As the bottom elevator 46 moves downwardly, the lifts 128 for the dancer bar 118 also move downwardly and permit the dancer bar 118 to rest on the stops 127. As the top elevator 47 and the article 221 move upwardly, the film 116 is pulled tightly across the top of the article 221 and it folds downwardly over the rear edge of the article 221 and loops underneath the dancer roll 118. In this position of the elevators, the plate 52 of the top elevator 47 is in horizontal alignment with the plate 53, and the plunger mechanism is then shifted rearwardly, the rod engaging the block 72 and causing a transfer of the article 221 to the plate 53, as shown in FIGS. 9 and 10. As the article 221 is being transferred to the plate 53, the film 116 is drawn underneath the rearward edge of the article 221, and when transfer of the article to the plate 53 is complete, the film overlaps the free end. The top plunger pushes the article 221 to a position where the overlapped portions of the film rest on a tack sealer 222 (FIGS. 2, 10 and 13) located just above the stationary blade 96 of the severing means and adjacent the forward edge of the plate 53. The tack sealer 222 is in the form of a heater which causes the overlapped portions of the film to be bonded or fused together over its entire width. After the bonding of the overlapped portions of the film is complete, the severing means is actuated to sever the film (FIG. 10) and the free end of the film 116 falls downwardly and is captured and held by the suction baffle plate 119, and a pair of transport arms 214 engage the article and push it rearwardly through an end folding means.

As the article 221 is being transferred from the top elevator to the plate 53, another article 223 (FIG. 10) is being transferred by the input mechanism 33 to the bottom elevator 46 and the cycle is repeated.

The foregoing described manipulation of the article 221 and the film 116 by the movement of the elevators 46 and 47 and the dancer roll 118 causes the film 116 to be folded completely lengthwise about the article. The wrapping mechanism further includes an end folding and sealing means (FIGS. 3, 4 and 15 to 27) for folding the film at the ends of the article under the article and further sealing the film.

The end folding and sealing means 54 comprises a pair of laterally spaced first folders 226 mounted on the top elevator 47 but laterally movable relative thereto, the first folders extending longitudinally of the machine just above the plate 52 of the top elevator 47. Each first folder 226 is in the form of an angle, and includes a relatively short vertically extending arm 227 and a relatively long arm 228 which slants upwardly and laterally of the machine from the short arm 227. The lateral distance between the folders 226 is adjusted such that the arms 227 are closely adjacent the longitudinal sides of an article being wrapped. The rearward edge 229 of each folder 226 is spaced from the rearward edge of the plate 52, and the rearward edge 229 of each folder 226 also angles rearwardly and laterally from the arm 227.

As the article 221 being wrapped is transferred from the bottom elevator 46 to the top elevator 47, the film 116 is pealed off the baffle plate 119 and the article slides over the free end of the film 116. The lateral dimension of the film 116 should be chosen so that the film extends laterally from the ends of the article 148 in both directions. The rearward edges 229 of the first folders 226 engage the end portions of the film 116 as it is being pushed on the top elevator, and the slope of the edges 229 causes a crease or fold, indicated by the numeral 231, to be formed in the forward portion of the film at both ends of an article as the article is pushed onto the top elevator 47.

As the top elevator 47 and an article thereon are being moved upwardly to the level of the plate 53, the film 116 is drawn tightly across the top of the article 221 as previously explained, and the fingers 87 prevent the article 221 from being pulled by the film 116 off of the rearward edge of the top elevator 47. The end folding and sealing means 54 further includes a pair of laterally spaced down folders 233 (FIGS. 18, 19, 21 and 27) which are positioned vertically over the first folders 226. The folders 233 extend longitudinally of the machine, and one folder 233 is positioned laterally outside the arm 227 of each first folder 226. As shown in FIGS. 2 to 4, the down folders 233 have sufficient longitudinal length that they extend from over the first holders 226 substantially entirely across the plate 53.

As shown in FIGS. 18 and 27, the portion 234 of the lower side of each folder 233, which is over the associated folder 226 slopes laterally outwardly and upwardly from its inner longitudinal edge, and the slope of the portions 234 has substantially the same angle as the arms 228 of the first folder 226. The portions 234 are spaced vertically above the upper surface of the arms 228 when the top elevator 47 is in its uppermost position, and the portions of the film 116 which overlie the first folders 226 are compressed between the folders 226 and 233, thus causing the film 116 to be drawn tightly endwise across the article 221 being wrapped.

After the top elevator and the article are in the uppermost position, the top plunger pushes the article 221 rearwardly onto the plate 53, as previously explained. Of course, the fingers 87 have previously been retracted.

As shown in FIGS. 19 and 27, the bottom side of each down folder 233 is formed such that the sloped portion 234 terminates substantially over the tack sealer 222, and rearwardly of the bottom side portion 234, is a bottom side portion 236 (FIGS. 19, 22 and 27) which is substantially horizontal. The portion 236 of the bottom side of each down folder 233 is also spaced rearwardly from the first folders 226 and therefore cannot interfere with them. As the article 221 is pushed rearwardly, the film 116 is held tightly around the article 221 and the portion 236 of the down folders 233 cause the end portions of the film 116 to be flattened, as shown in FIG. 9.

The end folding and sealing means may further include a vertical tab 237 (FIGS. 19 and 27) secured to each of the down folders 233 on its laterally outer side, the tabs 237 being adjacent the portions 236 and extending downwardly below the portions 236. The lower end 238 of each tab 237 is preferably rounded off, and this lower end 238 engages the end portions of the film 116 adjacent the rearward edge of the article and causes it to be folded back slightly. FIG. 20 shows the condition of the underside of an article, completely wrapped, the tabs 237 causing the folds indicated by the numeral 239.

It should be understood that it is not necessary that the tabs 237 be provided. Some types of film will be sufficiently folded back to form a good package solely by the action of the down folders 233, in which case the tabs 237 may be removed.

Concurrent with the article being transferred from the top elevator to the plate 53 is the previously described cutting or severing of the film after it has been folded longitudinally around the article, and the tack sealing of the overlapped portions of the film.

Rearwardly of the tack sealer, the plate 53 comprises a pair of latterally spaced front vanes 241 which support the article 221 at its ends, and a longitudinally extending tongue 242 which provides support for the article at its center. Each vane 241 has a portion 243 (FIGS. 22 and 27) which is turned upwardly at the laterally outer edge of the vane 241, the portions 241 extending generally parallel to the down folders 233 and being spaced laterally inward but adjacent the lower sides of the down folders. By this construction, as the article 148 is pushed along the vanes 241, the portions of the film 116 at the ends of the article are folded over the top of the portions 243 of the vanes 241 and then downwardly underneath the adjacent down folder 233 (FIG. 22).

Rearwardly of the portion 236 of the bottom side of each down folder 233 is a portion 244 which is horizontal and is spaced downwardly from the portion 236, the portion 244 thus causing increased lateral tension to be placed on the film 116, as shown in FIGS. 22 and 24. The laterally outer upturned edges 243 of each vane 241 terminates adjacent a rigid rod 246 which angles rearwardly and laterally inward from the down folders 233, the rods 246 being disposed horizontally below the level of the bottom side of the top folders 233.

As shown in FIG. 26, each front vane 241 terminates adjacent the associated rigid rod 246 and the terminating or rearward edge 247 of each vane 241 runs parallel to but is spaced forwardly from the associated rod 246. A pair of rear vanes 248 is also provided, each rear vane 248 being positioned rearwardly of a rod 246 and being secured to the underside of the associated down folder 233, the forward edge of each rear vane 248 running parallel to the associated rod 246 but being spaced a short distance rearwardly therefrom. As the article is pushed rearwardly across the plate 53 by the transfer arms 214, the article slides off of the front vanes 241 and on the rear vanes 248, and the inward slant of the edges 247, the rods 246 and the front edges 249 of the rear vanes 248 causes the portions of the film to be gradually turned or folded underneath the bottom of the article, as shown in FIGS. 23 to 25. The rigid rods 246 support the end portions of the film underneath the top folders 233 and the vanes 248, and the rods 246 are sufficiently close to the rear vanes 248 that they produce a drag on the end portions of the film 16 and cause it to be pulled tightly around the article being wrapped. Once the end portions of the film are folded flat against the underside of the article, the article is pushed along a longitudinal path extending across a main heater element or sealer 251 which is sufficiently hot to bond or fuse the overlapped portions of the film on the underside of the article and hermetically seal the article in the film.

Pressure applying means is also provided for pressing the article firmly against the main sealer 251. Such means comprises a plurality of longitudinally spaced pressure elements comprising rollers at each longitudinal edge of the article. In the present instance, two independently mounted rollers 252 (FIGS. 4, 28 and 29) are provided at each longitudinal edge of the article, each roller 252 being rotatably mounted on a bar 253 by means of a pin 254. Each bar 253 in turn is pivotally mounted on the frame of the machine by means of an arm 256 which is bent upwardly such that the pivotal axis of each bar 253 slants upwardly and laterally inwardly at an angle of approximately 15°, this axis being parallel to the axis of the associated roller 252. Further, each bar 253 slants rearwardly of the machine, but forwardly in the direction of travel of an article crossing the sealer 251, from the arm 256, and an article being pushed rearwardly of the machine by the arms 214 swings the rollers 252 upwardly and rearwardly. With the pivotal mounting described, each roller 252 swings in a plane which slants upwardly and laterally outwardly from the sealer 251. The positions of the rollers 252 are such that they roll over the longitudinal edges of the article 221, and the longitudinal spacing of the rollers is preferably such that both rollers at each side are in contact with an article for a portion of the time the article is on the sealer 251. When the article comprises irregularly shaped food in a tray having upturned edges (FIG. 29), the rollers independently ride over the edges and do not interfere with the food in the tray, and the weight of the rollers is such that the entire bottom surface of the article is pressed firmly against the main sealer 251. Stops are also provided to prevent the rollers from swinging downwardly and resting on the main sealer 251 when an article is not present, each stop comprising a roll pin 257 secured to and extending downwardly from each arm 256 and a second roll pin 258 secured to and extending outwardly from each bar 253. The pins 257 and 258 are positioned to engage and hold the bars 253 at an angle of approximately 45° to the vertical when an article is not present.

Each roller 252 preferably comprises a metal wheel 259 and an outer cover 260 (FIGS. 28 and 29) of an insulating material such as silicone rubber. The metal wheels are desirable to give the rollers sufficient weight to press an article down against the sealer, and the covers 260 are desirable to prevent the wheels from becoming too hot, due to the hot sealer 251, and damaging the wrapped article. In addition to preventing damage to the articles, the rubber covers 260 frictionally engage the edge portions of each article and prevent the edge portions from creeping upwardly on the slanted article engaging outer surfaces of the covers 260.

To summarize the folding of the portions of the film at the ends of the article, a pleat or fold is formed by the first folders 226 when the article is pushed onto the top elevator 47, the vertical arms 227 of the folders 226 flattening the film against the end edges of the article and also guiding the article onto the top elevator. The down folders 233 tighten the film endwise across the top of the article and guide the end portions of the film into the slots formed between the vanes 241 and 248. The upturned edges 243 of the vanes 241 raise the bottom portion of the film against the end edges of the article (FIGS. 22 and 23) to provide a tight wrap across the bottom of the article, and the rods 246 further tighten the film endwise across the top of the article. As the article is pushed rearwardly, the vanes 241 and 248 turn the end portions of the film under the article. After the end portions of the film have been turned under the article, the rollers 252 press the article, particularly at the ends of the article where the folds are, firmly against the main sealer 251 which seals the film around the article. The transport arms 214 then push the article to the output conveyor 216, which may lead to a transfer and labeling machine for automatically weighing and labeling the article.

To accommodate articles of different widths, means is preferably provided to adjust the lateral positions of the guides 41a of the infeed mechanism 33, guides on the lower elevator 46, the first folders 226, the top folders 233, the vanes 241 and 248, the rods 246, the transport arms 214, and the rollers 252. Such adjustment is effected by means including a hand wheel 261 (FIG. 1) located adjacent the outer face of one of the plate members 31.

All of the materials of the wrapping machine may be made of stainless steel and plastics which may be cleaned by steam, in order to meet various health ordinances requiring such a cleaning on machines for handling food.

We claim:

1. In a wrapping machine including a film feed and transport mechanism adapted to supply film as needed under substantially constant tension and means for wrapping an article in the film, the improvement of means for sealing the film underneath the article comprising a heating element, means for moving the wrapped article across said heating element, pressure means engaging the longitudinal edges only of the article for pressing the article downwardly against said heating element, said pressure means comprising a plurality of relatively heavy rotatably mounted rollers at each longitudinal edge of the article, said rollers rolling over the edges of the articles as the article is moved over said heating element, and a plurality of bars, each of said rollers being rotatably mounted on one of said bars, means for mounting each of said bars for pivotal movement on an axis which slopes generally upwardly and laterally inward from the side of the apparatus, the pivotal axes of said rollers on their associated bars being spaced downwardly and rearwardly from the axes of pivotal movement of said bars, whereby the article swings each of said rollers rearwardly and upwardly as the article is moved rearwardly under said rollers.

2. In a wrapping machine for wrapping an article in a heat sealable film, said machine including means for wrapping a section of film around the article and folding the loose edges of the film underneath the article, a heat element, and means for moving the article forwardly along a longitudinal path which extends across said heater element, the improvement of means for pressing the article downwardly against the heater element comprising at least one pressure means on each side of the path, and means for supporting each of said pressure means for movement in a plane which slants upwardly and laterally outwardly from the heater element. Each of said supporting means comprising pivot means which angles upwardly and longitudinally opposite to the direction of movement of an article and laterally inwardly from a side of said path, and a bar swingably carried by said pivot means and angling downwardly and longitudinally in the direction of movement of an article and laterally inwardly from said side of the path.

3. In a wrapping machine for wrapping an article in a heat sealable film, said machine including means for wrapping a section of film around the article and folding the loose edges of the film underneath the article, a heater element, and means for moving the article forwardly along a longitudinal path which extends across said heater element, the improvement of means for pressing the article downwardly against the heater element comprising at least one pressure means on each side of the path, and means for supporting each of said pressure means for movement in a plane which slants upwardly and laterally outwardly from the heater element each of said supporting means comprising pivot means which angles upwardly and longitudinally opposite to the direction of movement of an article and laterally inwardly from a side of said path, and a bar swingably carried by said pivot means and angling downwardly and longitudinally in the direction of movement of an article and laterally inwardly from said side of the path, and each of said pressure means comprising a roller rotatably mounted on said bar.

References Cited

UNITED STATES PATENTS

| 2,801,508 | 8/1957 | Prince | 53—379 X |
| 2,916,865 | 12/1959 | Anderson | 53—388 X |
| 2,853,841 | 9/1958 | Wertheimer | 53—389 X |
| 3,339,340 | 9/1967 | Piazze | 53—388 |
| 2,899,791 | 8/1959 | Anderson | 53—388 X |

THERON E. CONDON, Primary Examiner

N. ABRAMS, Assistant Examiner

U.S. Cl. X.R.

53—388